April 9, 1957     B. GARRARD     2,788,107
BEVERAGE DISPENSING APPARATUS
Filed Sept. 23, 1954
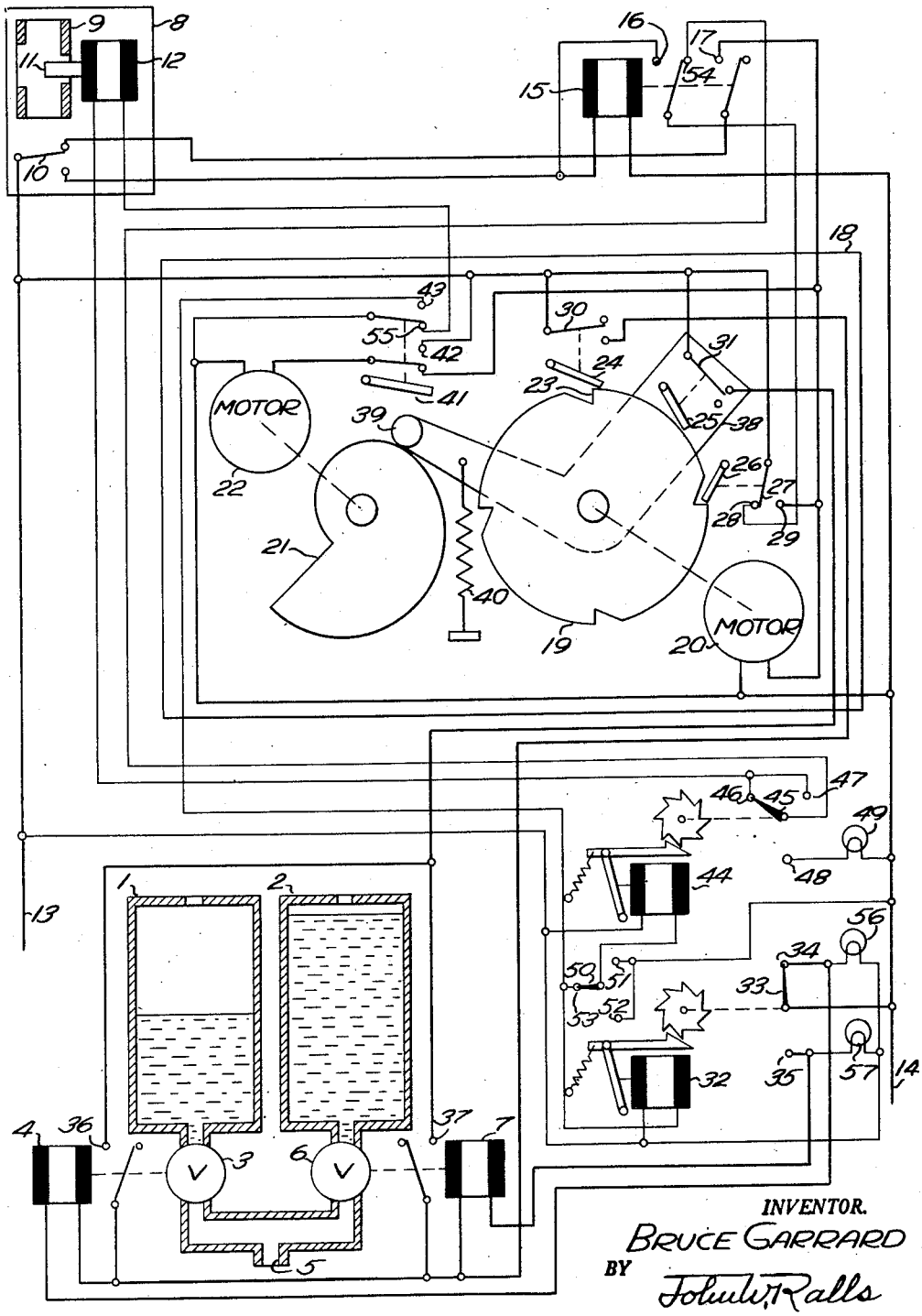
INVENTOR.
BRUCE GARRARD
BY
HIS ATTORNEY United States Patent Office 2,788,107
Patented Apr. 9, 1957

2,788,107

BEVERAGE DISPENSING APPARATUS

Bruce Garrard, Atlanta, Ga.

Application September 23, 1954, Serial No. 457,942

5 Claims. (Cl. 194—13)

This invention relates to improvements in beverage dispensing apparatus, and in particular to a coin-operated apparatus for dispensing beverage from two beverage storage tanks successively. Objects and advantages of the invention will appear as the description proceeds.

Briefly stated, in accordance with one aspect of the invention, a beverage dispensing apparatus has two beverage storage tanks containing milk or other beverage. Electrically controlled dispensing mechanism is provided for dispensing beverage from either of the two tanks, selectively under the control of electrical control mechanism, hereinafter more fully described, that operates the dispensing mechanism to dispense beverage from one tank until it is substantially empty, and then to dispense beverage from the other tank. A "substantially empty" tank is one that contains only a negligibly small reserve supply of beverage to insure that the tank will not be completely emptied before the last dispensing operation from that tank. A reserve of only one or two servings is adequate, although a larger reserve may be provided. For example, it has been found in practice that 212 six-ounce drinks can be dispensed from a forty-quart tank with a reserve after the last drink is dispensed of only eight ounces. When the apparatus is serviced periodically, the substantially empty tank may be refilled, or, preferably, may be replaced by a full tank, without affecting the vending of beverage from the other tank, and without the waste and inconvenience attendant to the refilling or replacement of a partially empty tank that is not substantially empty and may be half full, for example, as is often necessary with dispensing apparatus commonly used heretofore. Furthermore, loss of sales by reason of the apparatus becoming empty between the periodic servicings is greatly reduced.

The invention will be better understood from the following description taken in connection with the accompanying drawing, and its scope will be pointed out in the appended claims. In the drawing, the single figure is a schematic and circuit diagram illustrating a preferred form of the improved beverage dispensing apparatus.

Referring now to the drawing, milk or other beverage is contained in two beverage storage tanks 1 and 2. Conventional refrigerating mechanism, not shown, may be provided for cooling the beverage within the tanks. A normally closed valve 3, electrically controlled by a solenoid 4, may be opened by energizing solenoid 4 to dispense beverage from tank 1 through an outlet 5. A normally closed valve 6 may be opened by energizing a solenoid 7 to dispense beverage from tank 2 through outlet 5. Whenever desired, either of the tanks 1 and 2 may be refilled or, alternatively, may be replaced by a substantially identical tank full of beverage. Normally, each tank is refilled or replaced only when it is substantially empty, thereby avoiding the inconvenience or waste, or both, of refilling or replacing a partially empty tank that is not substantially empty. This is especially important in the case of perishable beverages such as milk, where the intermixing of new and older supplies of the beverage is most undesirable.

A conventional coin-receiving mechanism 8 has a coin chute 9 and a coin switch 10, so arranged that upon receipt of a predetermined amount in coins, or tokens, switch 10 is actuated downward momentarily. A coin-rejecting mechanism, represented by pin 11, is operated by a reject solenoid 12 to prevent the receipt of coins whenever solenoid 12 is de-energized.

Electrical conductors 13 and 14 are connected to a suitable electrical supply, usually a commercial 115 volt electrical outlet. When coin switch 10 is actuated downward, a circuit is completed which energizes a vend relay 15. Switch 10 is biased to return upward immediately to its initial position, but relay 15 is kept energized by a holding contact 16. A circuit is now completed through coin switch 10 and vend relay contact 17 which puts into operation the electrical control mechanism 18. Conventional mechanism, not shown, may be provided to deliver at this time a cup for receiving the beverage to be dispensed.

Preferably, control mechanism 18 is a time switch of the type described and claimed in my co-pending patent application, Serial No. 439,219, filed June 25, 1954. It includes an actuator 19 operable in repetitive cycles, during each of which actuator 19 is rotated one quarter revolution clockwise by an electric actuator motor 20. It also includes a cam 21 which is rotated a small fraction of a revolution counterclockwise during each cycle by an electric cam motor 22. Equally spaced around the periphery of actuator 19 are four recesses 23 which successively operate switch arms 24, 25 and 26 as the actuator rotates.

When the circuit through coin switch 10 and vend relay contact 17 is closed, motors 20 and 22 start to rotate actuator 19 and cam 21, respectively. As switch arm 26 is forced out of the actuator recess, a cycle control switch 27 opens a contact 28 and de-energizes the vend relay 15; but at the same time a contact 29 is closed and completes a circuit which continues the operation of motors 20 and 22 until actuator 19 has completed one-quarter revolution, whereupon switch arm 26 drops into the next actuator recess 23 and actuates cycle control switch 27 to stop motors 20 and 22. Thus actuator 19 is operated through one complete cycle each time that coin switch 10 is actuated by receipt of the desired amount in coins.

As actuator 19 moves through one cycle, switch arms 24 and 25 successively enter recess 23 and successively actuate timing switches 30 and 31.

A two-position ratchet relay selector switch has an operating solenoid 32 and a switch arm 33 which completes a circuit through a contact 34 or a contact 35, selectively. Each time that solenoid 32 is energized and then de-energized, the ratchet mechanism moves switch arm 33 from one to the other of contacts 34 and 35.

Assume that the selector switch is in its first position, as illustrated, with the circuit to contact 34 closed. When timing switch 30 is actuated, a circuit is completed which energizes solenoid 4 and opens valve 3 to dispense beverage from tank 1. After switch 30 re-opens, solenoid 4 is kept energized by a holding contact 36 until timing switch 31 is actuated, whereupon solenoid 4 is de-energized and valve 3 is closed. Since the circuit to solenoid 7 is open at contact 35, valve 6 remains closed.

Now assume that the selector switch is in its second position, with the circuit to contact 35 closed. When timing switch 30 is actuated, a circuit is completed which energizes solenoid 7 and opens valve 6 to dispense beverage from tank 2. After switch 30 re-opens, solenoid 7 is kept energized by a holding contact 37 until timing switch 31 is actuated, whereupon solenoid 7 is de-energized and valve 6 is closed. Since the circuit to solenoid 4 is open at contact 34, valve 3 remains closed.

From the foregoing, it is apparent that timing switches 30 and 31 control the time of the dispensing operation, and that the selector switch position determines from which tank beverage will be dispensed. Whenever solenoid 32 is energized and then de-energized, subsequent dispensing operations are shifted from one to the other of tanks 1 and 2. Preferably, dispensing is always from one tank until it is substantially empty, whereupon solenoid 32 is operated by automatic means hereinafter described so that subsequent dispensing is from the other tank.

Timing switch 31 and its switch arm 25 are mounted on a bracket 38 which is rotatable about the axis of actuator 19. Bracket 38 is attached to a cam follower 39 which is held against the periphery of cam 21 by a spring 40. When the apparatus is ready to dispense beverage from a full tank, cam 21 is in an initial position in which cam follower 39 rests against that portion of cam 21 having the smallest radius, so that switch arms 24 and 25 are a minimum distance apart. During each dispensing cycle, cam 21 is rotated by a small fraction of a revolution counterclockwise by cam motor 22, and the distance between switch arms 24 and 25 is increased slightly. In this way, the length of time in each cycle during which the valve is held open is gradually increased as the tank is emptied, to compensate for the decreasing rate of flow through the valve as the liquid level within the tank becomes lower. By making the cam 21 of proper shape, the same amount of beverage is dispensed in each cycle, regardless of changes in the liquid level within the storage tank.

When one tank is substantially empty, cam 21 will have been rotated sufficiently for cam follower 39 to actuate a reset switch 41. This closes a contact at 42 and completes a circuit which operates motor 22, but not motor 20, until cam 21 is returned to its initial position and cam follower 39 drops down to the smallest-radius portion of cam 21, whereupon contact 42 re-opens.

When reset switch 41 is actuated as described above, a contact 43 is closed and then re-opened, which energizes and then de-energizes relay 32 to operate the selector switch from one to the other of its two positions. The apparatus is now ready to dispense beverage from the other tank.

A three-position ratchet relay empty switch has an operating solenoid 44 and a switch arm 45 which completes a circuit through one of the contacts 46, 47 and 48, selectively. Each time that reset switch 41 is actuated, solenoid 44 is energized and then de-energized, whereupon the empty switch is operated clockwise from one to the next of its three positions. In the first two positions of the empty switch, a circuit is completed through either contact 46 or contact 47, selectively, to energize reject solenoid 12 and permit the receipt of coins. In the third position of the empty switch, which is reached after both tanks 1 and 2 have been emptied, the circuit to solenoid 12 is open, the reject solenoid is de-energized, and no coins will be accepted by the coin-receiving mechanism. At the same time, a circuit is completed through contact 48 which illuminates a signal lamp 49 to indicate that the dispensing apparatus is empty.

In normal use of the apparatus, the first tank will be refilled, or replaced with a full tank, before the second tank is empty. At this time, the empty switch will be in its second position, at contact 47. When the empty tank is refilled, a refill switch 50 is manually rotated one complete revolution, so that it momentarily crosses contacts 51 and 52 and returns to its initial position, as illustrated, at contact 53. As switch 50 crosses contacts 51 and 52, solenoid 44 is operated twice, thereby moving the empty switch around two positions clockwise to its first, or initial, position at contact 46. The selector switch position will not be affected, and dispensing from the second tank will continue when coin switch 10 is subsequently actuated. When the second tank is empty, both the selector switch and the empty switch will automatically be advanced one position, and beverage will thereafter be dispensed from the refilled first tank. When both tanks are empty, the empty switch will be advanced to its third position, and no coins will then be accepted.

When both tanks are refilled after the dispensing apparatus is empty, refill switch 50 may be turned through two complete revolutions. This will operate solenoid 44 four times, and will move the empty switch from its third position, at contact 48, to its first position, at contact 46. This provides a simple rule for the service man to follow: "Turn switch 50 through one complete revolution for each tank refilled."

It has been noted that reject solenoid 12 is de-energized when both storage tanks are empty. Whenever the vend relay 15 is energized, the circuit to solenoid 12 is opened at vend relay contact 54. During operation of actuator 19, the circuit to solenoid 12 is open at cycle control switch contact 28. While cam 21 is being reset, the circuit to solenoid 12 is open at reset switch contact 55. Solenoid 12 is also de-energized whenever the apparatus is disconnected from the electrical supply. Consequently, whenever the apparatus is not ready to begin a dispensing operation, reject solenoid 12 is de-energized, and coins will not be received.

If desired, signal lamps 56 and 57 may be connected in the circuit as shown, to indicate the tank from which beverage will be dispensed at the next operation of the apparatus.

This invention is not limited to specific embodiments herein illustrated and described. The following claims are intended to cover all changes and modifications which do not depart from the true spirit and scope of the invention.

I claim:

1. Beverage dispensing apparatus comprising first and second beverage supply tanks, electrical control mechanism operable in repetitive cycles, said control mechanism having a timing switch actuated once in each of said cycles and a reset switch actuated after a plurality of said cycles, a selector switch operable to first and second positions, means dispensing beverage from said first tank upon actuation of said timing switch when said selector switch is in its first position and dispensing beverage from said second tank upon actuation of said timing switch when said selector switch is in its second position, and means operating said selector switch from one to the other of its positions upon actuation of said reset switch.

2. Beverage dispensing apparatus comprising first and second beverage supply tanks, a first electrically controlled valve operable to dispense beverage from said first tank, a second electrically controlled valve operable to dispense beverage from said second tank, electrical control mechanism operable in repetitive cycles, said control mechanism having first and second timing switches actuated successively once in each of said cycles and a reset switch actuated after a plurality of said cycles, a selector switch operable to first and second positions, circuit means effective when said selector switch is in its first position to open said first valve when said first timing switch is actuated and to close said first valve when said second timing switch is actuated, said second valve remaining closed, circuit means effective when said selector switch is in its second position to open said second valve when said first timing switch is actuated and to close said second valve when said second timing switch is actuated, said first valve remaining closed, and means operating said selector switch from one to the other of its positions upon actuation of said reset switch, said reset switch being actuated when the tank from which beverage is being dispensed is substantially empty.

3. Beverage dispensing apparatus comprising first and second beverage supply tanks, coin-receiving mechanism including a coin switch actuated by receipt of a predetermined amount in coins, electrical control mechanism operable in repetitive cycles, circuit means operating said control mechanism through one of said cycles upon each actuation of said coin switch, said control mechanism having a timing switch actuated once in each of said cycles and a reset switch actuated after a plurality of said cyles, a ratchet relay selector switch operable to first and second positions, means dispensing beverage from said first tank upon actuation of said timing switch when said selector switch is in its first position and dispensing beverage from said second tank upon actuation of said timing switch when said selector switch is in its second position, and means operating said selector switch from one to the other of said circuit positions upon actuation of said reset switch.

4. Beverage dispensing apparatus comprising first and second beverage supply tanks, coin-receiving mechanism actuated by receipt of a predetermined amount in coins, coin-rejector mechanism operable to prevent the receipt of coins, control mechanism operable in repetitive cycles, means operating said control mechanism through one of said cycles upon each actuation of said coin-receiving mechanism, a selector switch operable to first and second positions, means effective when said selector switch is in its first position to dispense beverage from said first tank during each cycle of a first plurality of cycles of operation of said control mechanism, means effective when said selector switch is in its second position to dispense beverage from said second tank during each cycle of a second plurality of cycles of operation of said control mechanism, means operating said selector switch from one to the other of its two positions after said first plurality of cycles of operation of said control mechanism, and means operating said coin-rejector mechanism to prevent the receipt of coins after said second plurality of cycles of operation of said control mechanism.

5. Beverage dispensing apparatus comprising first and second beverage supply tanks, a first electrically controlled normally closed valve operable to an open position to dispense beverage from said first tank, a second electrically controlled normally closed valve operable to an open position to dispense beverage from said second tank, coin-receiving mechanism including a coin switch actuated by receipt of a predetermined amount in coins, coin-rejector mechanism including a normally energized reject solenoid operable to a de-energized position to prevent the receipt of coins, electrical control mechanism including an actuator operable in repetitive cycles and a cam rotatable from an initial position, means operating said actuator through one cycle each time said coin switch is actuated, means rotating said cam through a fraction of a revolution during each cycle of said actuator, first and second timing switches actuated successively once in each cycle of said actuator, a reset switch actuated once in each revolution of said cam, means resetting said cam to its initial position upon actuation of said reset switch, a ratchet relay selector switch operable to first and second positions, circuit means effective when said selector switch is in its first position to open said first valve upon actuation of said first timing switch and to close said first valve upon actuation of said second timing switch, said second valve remaining closed, circuit means effective when said selector switch is in its second position to open said second valve upon actuation of said first timing switch and to close said second valve upon actuation of said second timing switch, said first valve remaining closed, means operating said selector switch from one to the other of its two positions upon each actuation of said reset switch, a ratchet relay empty switch operable to first, second and third positions, means operating said empty switch from one to the next of its three positions upon each actuation of said reset switch, means operable to reset said empty switch to its first position, and circuit means de-energizing said reject solenoid whenever said actuator is being operated, whenever said cam is being reset, and whenever said empty switch is in its third position.

References Cited in the file of this patent
UNITED STATES PATENTS

| 2,118,704 | Grontowski | May 24, 1938 |
| 2,258,636 | Young et al. | Oct. 14, 1941 |
| 2,275,471 | Samiran | Mar. 10, 1942 |
| 2,409,245 | Black | Oct. 15, 1946 |
| 2,633,959 | Von Stoeser | Apr. 7, 1953 |